Patented Sept. 12, 1944

2,358,202

UNITED STATES PATENT OFFICE 2,358,202

METHOD OF PRODUCING GELS

Abraham Sidney Behrman, Chicago, Ill., assignor to Infilco Incorporated, a corporation of Delaware No Drawing. Application December 20, 1940, Serial No. 371,000

13 Claims. (Cl. 23—182)

The present invention relates to an improved process for the production of inorganic gels, and has particular reference to improvements in the manufacture of relatively low density gels of the type described in Patent 1,772,055, the present application constituting a continuation in part of my copending application Serial No. 136,353, filed April 12, 1937, now Patent No. 2,302,832.

In the production of inorganic gels such as silica gel it is customary to mix solutions of reactants together so that they may set in a relatively voluminous hydrogel form, after which the hydrogel is dried beyond a critical point at which it loses its hydrogel characteristics and becomes dry irreversible particles.

The drying operation normally is accompanied by a substantial shrinking of the hydrogel, so that the final product is of much smaller volume than the initial hydrogel. Of course, this decrease in volume is accompanied by a substantial increase in the concentration of solids in the gel. As suggested in Miller Patent 1,772,055, the increase in density of the final dried gel particles may be retarded by subjecting the initially produced hydrogel to autoclaving under non-evaporative conditions prior to finally drying the gel to irreversible form.

A principal object of the present invention is an improvement in this process which facilitates the production of low density gels, the improvement involving the step of subjecting the hydrogel to mechanical compression to produce an initial reduction in volume prior to subjecting the gel to autoclaving.

A further object of the invention is to produce low density irreversible inorganic gels by forming a normal hydrogel; subjecting the hydrogel to mechanical compression to such an extent as substantially to reduce the volume of the material by squeezing out dissolved salts, to increase the concentration of solids therein, and to physically alter the gel structure; subjecting the gel to autoclaving; and thereafter drying the gel to irreversible form.

These and other objects will be observed upon a consideration of the following description of a preferred embodiment of the invention.

As disclosed in Patrick Patent 1,297,724 and in my Patent 1,755,496, solid, dry and relatively hard particles of silica gel are produced by reacting water-soluble silica compounds with an acid or with an acid and ammonia to form a hydrogel from which the water of hydration is removed by drying. The resulting product retains its granular or particle form and acquires an ultimate density which may be of the order of 30 to 40 pounds per cubic foot. Other methods may be employed for producing a dry silica gel of lower density, such as by dehydrating the hydrogel with alcohol or the like. These latter types of processes have not met with favor commercially because of their expense and process difficulties.

As suggested in Miller Patent 1,772,055, a relatively low density dry irreversible inorganic gel may be produced by effecting the hydrogel reaction and autoclaving the hydrogel with water at a temperature of between 212° and 325° F. In some cases the water content of the hydrogel is reduced during the autoclaving operation to effect the conversion of the gel into irreversible form.

As before stated, the method of producing the hydrogel in accordance with the present invention may vary quite widely. Since silica gel is an inorganic gel which may be treated with particular advantage in accordance with my improved process, reference will be made specifically herein to this particular material.

Silica hydrogel may be produced by combining an alkaline silica compound with an acid or with an acid and ammonia in accordance with well known formulae. The process is carried out in a relatively dilute solution which sets up into a relatively voluminous hydrogel which may contain water to the extent of approximately 93 per cent. This water with the dissolved salts resulting from the reaction constitutes the mother liquor in which the gel structure is incorporated. The resulting hydrogel has a firm, stiff body, which after a time may contract slightly with the loss of a small quantity of water by syneresis. As described in my Patent 1,755,496, solutions of sodium silicate, sulfuric acid and ammonium hydroxide are combined to produce a silica hydrogel of high concentration.

In its original form the hydrogel is relatively voluminous and since it may contain approximately 93 per cent water it usually is quite slippery. Furthermore, upon drying the gel shrinks to such an extent as to result in the formation of a dried particle of relatively high density.

The next step in the gel-forming process of the present invention consists in subjecting the hydrogel in its relatively voluminous form to the action of mechanical pressure to reduce the original volume of the gel. For example, a hydrogel containing approximately 93 per cent water may be subjected to a pressure of the order of 100 to 150 pounds per square inch in an hydraulic press, until the gel has been reduced in volume to approximately 40 per cent of its original volume. This decrease in volume is effected by an extrusion of the mother liquor with its dissolved salts, thereby increasing the silica concentration to approximately two and one-half times its original value.

The use of mechanical pressure in this manner reduces the water content of the hydrogel below the point at which it is possible to initially produce the hydrogel by reaction of chemicals, and has the additional function of physically distorting the cellular structure of the gel. This disruption or distortion of the cellular structure of the hydrogel, in cooperation with the subsequent autoclaving to which the hydrogel is subjected, provides a final dried gel of low and controlled density.

The hydraulically pressed and physically distorted hydrogel will have a water content of about 82 percent, and the anhydrous silica concentration will be of the order of 7 to 8 pounds per cubic foot when the hydrogel is broken into small pieces. Also, it will be found that the pressed hydrogel likely has lost its originally slippery character and has become easily granulated and crumbly, even though it definitely retains its hydrogel structure.

In the next step of the process the hydraulically pressed hydrogel is subjected to heat treatment in an autoclave in which substantially no drying action occurs. For example, I have found that subjecting the pressed hydrogel to the action of saturated steam under pressure of 75 to 80 pounds per square inch for four hours will result in the structure of the hydrogel "setting" to such an extent as to result in a product of desirable physical characteristics and low density when the product is dried into irreversible particle form. A typical pressed and autoclaved hydrogel will have an ultimate density of the order of 12 to 15 pounds per cubic foot when subsequently dried, which corresponds to a shrinkage to about one-half its original volume, as compared to a much greater shrinkage where the hydrogel is not subjected to the combined pressing operation and autoclaving. The same hydrogel when subjected to autoclaving under the same conditions but without the initial pressing operation will have a density around 22 pounds per cubic foot when the gel is dried.

The effect of the autoclaving seems to be a function of both time and pressure of steaming, and to some extent a deficiency of pressure may be compensated for by an increase in time of treatment, and vice versa. In fact, steaming the pressed hydrogel even at atmospheric pressure will result in some decrease in the shrinkage of the gel on drying.

It will be understood that the residual salts may be washed out of the hydrogel at any convenient stage in the process. The washing may be before or after the autoclaving. For some uses it is not necessary to wash out the salt. If desired, an acid wash may be employed to remove any iron or ammonia which may be incorporated in the gel.

Other inorganic gels such as metallic oxide gels alone or in combination with silica may be treated in the manner described to produce gels of low density. Other examples include aluminum oxide-silica gels, gels of vanadium oxide, iron oxide or hydroxide, gels of the zeolitic type such as those composed of sodium oxide, aluminum oxide and silica and plural oxide gels in which two or more of these or other oxides are included. The process is particularly useful in the manufacture of the gel catalysts which are used rather widely in petroleum cracking and other processes, as well as in the production of adsorbents.

After the autoclaving operation is completed the pressed and autoclaved gel may be dried past the critical point at which the material is converted into irreversible particle form. The particular moisture content at which this change occurs will vary with different gels. Some or all of the drying may be effected in the autoclave, or the material may be air or oven-dried, as desired. One advantageous use of gels of this character is as a filler for battery separators as described in my copending application Serial No. 136,353, filed April 12, 1937, now Patent No. 2,302,832. When producing separators of this character the autoclaved hydrogel is combined with uncured rubber before the hydrogel is dried, and while it still retains its colloidal characteristics as a hydrogel.

The steaming of the hydrogel after the pressing operation, either under increased pressure or otherwise, materially helps to provide for the controlled density of the final, dried gel.

The combined initial pressing and subsequent autoclaving has a definite effect upon the physical characteristic of the gel material. The physical distortion accompanying the mechanical pressing operation and the setting effect of the autoclaving combine to secure a permanent benefit with respect to the physical characteristics of the material. Its low density makes the improved material desirable for many uses and the economy accompanying this low density is substantial. The particles formed by the process are rugged notwithstanding their relatively low density. The low density and rugged characteristics of the improved material make it desirable for catalytic purposes where chemically similar substances have been utilized heretofore. The material has relatively large adsorbent capacity per unit weight.

The term "autoclaving" is used herein in its usual technical sense of treating a material in a moist atmosphere at a temperature of 100° C. or above in an air-tight vessel, usually with steam or moisture added to the atmosphere contained therein. Such treatment is under super-atmospheric pressure, as in order to prevent any substantial evaporation of the material being treated, it is necessary to raise the vapor pressure of the atmosphere within the autoclave to at least that of the material undergoing treatment, the vapor pressure increasing proportionately with the temperature within the autoclave. Thus, in the treatment of silica hydrogel in an autoclave the temperature ordinarily will be several degrees above the boiling point of water, 100° C., and the water vapor pressure will be above one atmosphere.

The various changes which may be made without departing from the scope of the invention are intended to be included in the appended claims.

I claim:

1. The process of producing inorganic gels of low density, which comprises mixing aqueous gel forming reactants to form a relatively voluminous hydrogel, subjecting said hydrogel to a pressure of the order of 100 to 150 pounds per square inch to remove a substantial quantity of mother liquor therefrom, then subjecting the pressed hydrogel to the action of saturated steam under pressure of about eighty pounds per square inch for a period of about four hours, and then drying the hydrogel to irreversible particle form.

2. The process of producing silica hydrogel, which comprises forming a hydrogel by reacting a soluble silicate with an acid, pressing a major quantity of mother liquor from the hydrogel, and then subjecting the pressed hydrogel to a temperature of above 100° C. under superatmospheric pressures.

3. The process of producing a dried silica gel of low density, which comprises forming a hydrogel by reacting solutions of a soluble silicate and an acid, allowing the reaction mixture to set up into the form of a hydrogel, pressing the hydrogel sufficiently to reduce the moisture content of said hydrogel to about 80 per cent of said hydrogel by weight, then subjecting the compressed hydrogel to a temperature of above 100° C. under non-evaporative pressures for a sufficient period of time to reduce shrinkage of the hydrogel upon subsquent drying, and subsequently drying the gel.

4. In the production of silica gel, the steps which comprise mixing the reactants for said gel in solution to produce a relatively voluminous silica hydrogel, pressing a major quantity of mother liquor from the hydrogel to produce a non-slippery and readily granulated hydrogel, subsequently subjecting the pressed hydrogel to the action of steam under superatmospheric pressure for a period sufficient to reduce shrinkage of the hydrogel upon subsequent drying, and finally drying said hydrogel.

5. A process of producing silica gel which comprises mixing aqueous reactants to produce a silica hydrogel, reducing the moisture content of the hydrogel to the order of about 82 per cent of the total weight of the hydrogel by pressing the hydrogel, subsequently subjecting the compressed hydrogel to autoclaving at a temperature above 100° C. under non-evaporative pressures, and finally drying the hydrogel to irreversible particle form.

6. A process of producing silica gel which comprises mixing aqueous reactants to produce a silica hydrogel, compressing the hydrogel to remove a major quantity of mother liquor therefrom, subsequently subjecting the pressed hydrogel to the action of saturated steam under pressure of about eighty pounds per square inch for a period of about four hours, and finally drying the hydrogel to irreversible particle form.

7. A process of producing silica gel which comprises mixing aqueous reactants to produce a silica hydrogel, reducing the moisture content of the hydrogel to the order of about 82 per cent of the total weight of the hydrogel by pressing, then subjecting the pressed hydrogel to the action of saturated steam under pressure of about eighty pounds per square inch for a period of about four hours, and finally drying the hydrogel to irreversible particle form.

8. The process of producing silica gel which comprises producing a silica hydrogel, compressing the hydrogel to remove a major quantity of mother liquor therefrom, then subjecting the compressed hydrogel to autoclaving at a temperature of above 100° C. under non-evaporative conditions for a period of time sufficient to reduce shrinkage of the hydrogel upon subsequent dehydration, and finally further dehydrating said gel by evaporation.

9. The process of producing an inorganic gel which comprises forming a relatively voluminous hydrogel from mixed reactants, pressing a major quantity of water from the hydrogel, then subjecting the pressed hydrogel to a temperature of more than 100° C. and a vapor pressure sufficient to prevent substantial drying of said hydrogel while subjected to said temperature and continuing such temperature and pressure for a period of time sufficient to reduce shrinkage of the hydrogel upon subsequent drying, and drying the hydrogel to irreversible particle form.

10. The process of producing an inorganic gel which comprises mixing reactants for said gel in solution form to produce a relatively voluminous hydrogel, subjecting said hydrogel to mechanical pressure sufficient to reduce the moisture content of said hydrogel to the order of about 82 per cent of the total weight thereof, then subjecting the pressed hydrogel to the action of saturated steam at superatmospheric pressure and finally drying the gel to irreversible particle form.

11. The process of producing an inorganic gel of relatively low density which comprises mixing aqueous reactants for said gel to form a relatively voluminous hydrogel, subjecting said hydrogel to mechanical pressure to remove a major quantity of mother liquor therefrom, then subjecting the compressed hydrogel to autoclaving at a temperature of more than 100° C. and a pressure of one atmosphere or above and finally removing further quantities of water from said autoclaved hydrogel to form irreversible particles therefrom.

12. The process of producing a silica hydrogel which comprises mixing aqueous reactants to produce a silica hydrogel, subjecting the hydrogel to pressure of about 100 to 150 pounds per square inch to express mother liquor, then subjecting the pressed hydrogel to the action of saturated steam under a pressure of about 80 pounds per square inch for a period of about four hours.

13. A process for producing a silica hydrogel which comprises mixing aqueous reactants to produce a silica hydrogel, subjecting the hydrogel to a pressure sufficient to reduce the moisture content of the hydrogel to the order of about 82 per cent of the total weight of the hydrogel, and subsequently subjecting the pressed hydrogel to the action of saturated steam under a pressure of about 80 pounds per square inch for a period of about four hours.

ABRAHAM SIDNEY BEHRMAN.